(12) United States Patent
Sugimoto et al.

(10) Patent No.: US 9,187,049 B2
(45) Date of Patent: Nov. 17, 2015

(54) SADDLED VEHICLE

(71) Applicant: HONDA MOTOR CO., LTD., Tokyo (JP)

(72) Inventors: Koichiro Sugimoto, Wako (JP); Kota Matayoshi, Wako (JP); Chihiro Iida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/385,841

(22) PCT Filed: Feb. 8, 2013

(86) PCT No.: PCT/JP2013/053128
§ 371 (c)(1),
(2) Date: Sep. 17, 2014

(87) PCT Pub. No.: WO2013/140891
PCT Pub. Date: Sep. 26, 2013

(65) Prior Publication Data
US 2015/0076790 A1 Mar. 19, 2015

(30) Foreign Application Priority Data

Mar. 21, 2012 (JP) ................................ 2012-063874

(51) Int. Cl.
*B62K 19/38* (2006.01)
*B60R 16/02* (2006.01)
*F16L 3/06* (2006.01)
*B62L 3/02* (2006.01)
*B62J 99/00* (2009.01)

(52) U.S. Cl.
CPC ............ *B60R 16/0215* (2013.01); *B62J 99/00* (2013.01); *B62K 19/38* (2013.01); *B62L 3/023* (2013.01); *F16L 3/06* (2013.01); *B62J 2099/002* (2013.01); *B62J 2099/0046* (2013.01)

(58) Field of Classification Search
CPC ......................... B62K 19/38; B62J 2099/0046
USPC ......................................................... 280/283
See application file for complete search history.

(56) References Cited

U.S. PATENT DOCUMENTS

| 6,492,805 | B1 | 12/2002 | Wakabayashi et al. |
| 7,621,566 | B2 * | 11/2009 | Fujita et al. ................. 285/125.1 |

(Continued)

FOREIGN PATENT DOCUMENTS

| CN | 1290621 A | 4/2001 |
| CN | 1291872 C | 12/2006 |

(Continued)

OTHER PUBLICATIONS

International Search Report dated Apr. 23, 2013 corresponding to International Patent Application No. PCT/JP2013/053128 and English translation thereof.

*Primary Examiner* — Joseph Rocca
*Assistant Examiner* — Michael Stabley
(74) *Attorney, Agent, or Firm* — Squire Patton Boggs (US) LLP

(57) ABSTRACT

The vehicle has a first clamp unit which fixes a harness for a wheel speed sensor above an outer tube on the side on which a wheel speed sensor. The vehicle has a second clamp unit which bundles the harness and a brake hose at substantially the same height as that of the first clamp unit above an outer tube on the side on which a caliper is provided. The second clamp unit includes a harness second cramp for fixing the harness and also a harness third cramp which changes the orientation direction of the harness so as to be oriented along the brake hose. The harness and the brake hose form a swing part which is curved in the horizontal direction between the second clamp unit and a bottom bridge.

9 Claims, 11 Drawing Sheets

(56) References Cited

U.S. PATENT DOCUMENTS

| | | | |
|---|---|---|---|
| 7,918,301 B2 * | 4/2011 | Ito et al. | 180/219 |
| 8,177,250 B2 * | 5/2012 | Fukuyama et al. | 280/288.4 |
| 8,444,164 B2 * | 5/2013 | Mikura et al. | 280/279 |
| 2005/0082821 A1 | 4/2005 | Fujita et al. | |
| 2013/0026731 A1 * | 1/2013 | Mikura et al. | 280/279 |

FOREIGN PATENT DOCUMENTS

| | | |
|---|---|---|
| DE | 60019054 T2 | 8/2005 |
| DE | 60027801 T2 | 11/2006 |
| DE | 602004009257 T2 | 7/2008 |
| EP | 1088751 A2 | 4/2001 |
| EP | 1514784 A1 | 3/2005 |
| EP | 1514790 A2 | 3/2005 |
| ES | 2192946 A1 | 10/2003 |
| ES | 2238956 T3 | 9/2005 |
| ES | 2263103 T3 | 12/2006 |
| JP | 2001-165949 A | 6/2001 |
| JP | 2002-029395 A | 1/2002 |
| JP | 2005-082024 A | 3/2005 |
| JP | 2007-076555 A | 3/2007 |
| KR | 2001-0050774 A | 6/2001 |
| MY | 128738 A | 2/2007 |
| TW | 526153 B | 4/2003 |

* cited by examiner

SADDLED VEHICLE

TECHNICAL FIELD

The present invention relates to a saddled vehicle and, more particularly, to a saddled vehicle having a wheel speed sensor for a front wheel, a sensor harness extended from the wheel speed sensor, and an attachment unit that routes the sensor harness together with a front-wheel brake hose.

BACKGROUND ART

In a saddled vehicle such as a motorcycle or tricycle, there is a case that a brake hose for a front wheel and a cable for an electric speed sensor are routed in a front fork supporting a front wheel. For example, a motorcycle disclosed in Patent Literature 1 is provided with a wheel speed detecting device on the right or left side of the vehicle body, that is, on the same side as the side where a front disc brake is provided. A brake hose extended from a caliper of the front disc brake and a harness extended from an electromagnetic rotation sensor of the wheel speed detecting device are routed upward along the front fork.

CITATION LIST

Patent Literature

Patent Literature 1: JP 2001-165949 A

SUMMARY OF INVENTION

Technical Problem

In the routing structure described in the Patent Literature 1, since a harness of a wheel speed sensor is routed on the brake caliper side, it is sufficient to bundle the brake hose and the harness and route brake hose and the harness so as to be slackened as the front fork expands and contracts in the head pipe or the top bridge direction. However, in the configuration that a single brake disc is provided on one side of the front fork and an electric speed sensor is provided on the other side, it is not easy to bundle the brake hose and the harness. When the harness is routed singularly without being bundled with the brake hose, since the harness itself has low rigidity and high flexibility relative to the brake hose, if slack is provided so as to be adaptive to expansion/contraction of the front fork, the degree of deformation, the direction of deformation, and shape are not easily predicted. It is, consequently, difficult to prevent interference between members such as a radiator positioned on the rear side of the front wheel and the harness at the time of steering.

A purpose of the present invention is to solve the problem and to provide a saddled vehicle having a routing structure capable of efficiently bundling a brake hose and a harness provided on right and left sides of a front wheel.

Solution to Problem

To solve the afore-mentioned problem, certain embodiments of the present invention includes a saddled vehicle comprising: a front fork (28) including a pair of right and left inner tubes (281R and 281L) and outer tubes (282R and 282L) in which lower parts of the inner tubes (281R and 281L) are slidably fit and supporting a front wheel (WF) by lower ends of the outer tubes (282R and 282L); a disc brake (40), and a wheel speed sensor (49) detecting rotation of the front wheel (WF), wherein the disc brake (40) is a single disc brake for the front wheel, which is provided only one of right and left sides of the front wheel (WF), the wheel speed sensor (49) is provided on the other side of the right and left sides of the front wheel (WF), a brake hose (50) and a harness (51) are routed upward from the disc brake (40) and the wheel speed sensor (49), respectively, and the vehicle comprises a first clamp unit (57) that fixes the harness (51) at upper portion of the outer tube (282L) as the side provided with the wheel speed sensor (49), as one of the outer tubes (282R and 282L), and a second clamp unit (58) that bundles and fixes the harness (51) routed via the first clamp unit (57) and the brake hose (50) at substantially the same height as the first clamp unit (57) at upper portion of the outer tube (282R) as the side on which the disc brake (40) is provided as one of the outer tubes (282R and 282L), and routes the harness (51) and the brake hose (50) further upward from the fixing position. The vehicle also comprises a second clamp unit that includes first harness fixing means (641) that fixes the harness (51) oriented from the first clamp unit (57) toward the second clamp unit (58) in the oriented posture, and second harness fixing means (642) that changes the orientation direction of the harness (51) fixed by the first harness fixing means (641) so as to be oriented along the brake hose (50) which is pulled from the disc brake (40) and routed upward and fixes the harness (51).

In certain embodiments of the present invention the second clamp unit (58) further comprises first hose fixing means (643) that fixes the brake hose (50) at a height which is substantially the same as that of the second harness fixing means (642).

Certain embodiments of the present invention include a saddled vehicle comprising a front fork (28) including a pair of right and left inner tubes (281R and 281L) and outer tubes (282R and 282L) in which lower parts of the inner tubes (281R and 281L) are slidably fit and supporting a front wheel (WF) by lower ends of the outer tubes (282R and 282L), and a disc brake (40). and a wheel speed sensor (49) detecting rotation of the front wheel (WF The disc brake (40) is a single disc brake for the front wheel, which is provided only one of right and left sides of the front wheel (WF), and the wheel speed sensor (49) is provided on the other side of the right and left sides of the front wheel (WF), a brake hose (50) and a harness (51) are routed upward from the disc brake (40) and the wheel speed sensor (49), respectively. The vehicle also includes a first clamp unit (57) that fixes the harness (51) at upper portion of the outer tube (282L) as the side provided with the wheel speed sensor (49), as one of the outer tubes (282R and 282L). and a second clamp unit (58) that bundles and fixes the harness (51) routed via the first clamp unit (57) and the brake hose (50) at substantially the same height as the first clamp unit (57) at upper portion of the outer tube (282R) as the side on which the disc brake (40) is provided as one of the outer tubes (282R and 282L), and routes the harness (51) and the brake hose (50) further upward from the fixing position. The vehicle also comprises a bottom bridge (27) coupling the pair of right and left inner tubes (281R and 281L) to each other at the bottom of a head pipe (30) provided in a vehicle body front part a third clamp unit (59) that fixes the harness (51) and the brake hose (50) routed upward from the second clamp unit (58) to the bottom bridge (27). Between the second clamp unit (58) and the third clamp unit (59), the second clamp unit (58) and the third clamp unit (59) are constructed to form a swing part (B1) in which the brake hose (50) and the harness (51) are curved convexly from the side on which the disc brake (40) is attached toward the side on which the wheel speed sensor (49) is attached.

In certain embodiments of the present invention the brake hose (50) includes a protector member (501) having a cylindrical shape and a hose body (502) which is housed in the protector member (501), outer diameter of the harness (51) is set to be smaller than that of the protector member (501), and the second clamp unit (58) and the third clamp unit (59) are constructed so that the harness (51) bundled with the brake hose (50) is routed rearward of the brake hose (50) between the second clamp unit (58) and the third clamp unit (59).

In certain embodiments of the present invention the third clamp unit (59) is disposed so as to be biased to the same side as the side on which the second clamp unit (58) is provided in the vehicle width direction.

In certain embodiments of the present invention the third clamp unit (59) includes third harness fixing means (742) which holds the harness (51) and second hose fixing means (741) which holds the brake hose (50), and the third harness fixing means (742) and the second hose fixing means (741) extend in the vehicle width direction and are disposed substantially horizontally.

Certain embodiments of the present invention include a second stay (63) which fixes the first harness fixing means (641), the second harness fixing means (642), and the first hose fixing means (643) integrally with the outer tube (282R); and a third stay (73) which fixes the third harness fixing means (742) and the second hose fixing means (741) integrally to the inner tube (281R).

Advantageous Effects of Invention

According to certain embodiments of the invention, a disc brake is a single disc brake for a front wheel, which is provided only one of right and left sides of the front wheel WF, a wheel speed sensor is provided on the other side of the right and left sides of the front wheel, a brake hose and a harness are routed upward from the disc brake and the wheel speed sensor, respectively, and the vehicle comprises a first clamp unit that fixes the harness at upper portion of the outer tube as the side provided with the wheel speed sensor, as one of the outer tubes, and a second clamp unit that bundles and fixes the harness routed via the first clamp unit and the brake hose at substantially the same height as the first clamp unit at upper portion of the outer tube as the side on which the disc brake is provided as one of the outer tubes, and routes the harness and the brake hose further upward from the fixing position. Therefore, a harness for a vehicle speed sensor is fixed by a first clamp unit in an upper part of outer tube on one side of a front fork made by a pair of right and left tubes (inner tubes and outer tubes), routed to a second clamp unit provided in an upper part of outer tube on the other side of the front fork in shortest distance, fixed in the second clamp unit, bundled with a brake hose, and routed upward, so that the length of the harness is not unnecessarily long. In addition, since both the first and second clamp units are provided at unspring portion, it is unnecessary to provide the harness with a part which is slackened between the first and second clamp units and to design a vehicle in consideration of interference between the harness and members rearward of the front wheel.

In addition, the second clamp unit includes first harness fixing means that fixes the harness oriented from the first clamp unit toward the second clamp unit in the oriented posture; and second harness fixing means that changes the orientation direction of the harness fixed by the first harness fixing means so as to be oriented along the brake hose which is pulled from the disc brake and routed upward and fixes the harness. Therefore, the direction of the harness can be changed between first harness fixing means and second harness fixing means provided for the second clamp unit. Consequently, the curvature radius of the direction changing part can be set to the minimum. As a result, it facilitates assurance of a curved routing path of the harness and the brake hose necessary at spring portion.

According to certain embodiments of the invention, the second clamp unit further comprises first hose fixing means that fixes the brake hose at a height which is substantially the same as that of the second harness fixing means. Therefore, the harness and the brake hose are fixed and bundled at substantially the same heights. Consequently, it is easy to make the harness and the brake hose oriented in the same direction regardless of expansion/contraction of the front fork.

Certain embodiments of the invention include a bottom bridge coupling the pair of right and left inner tubes to each other at the bottom of a head pipe provided in a vehicle body front part; and a third clamp unit that fixes the harness and the brake hose routed upward from the second clamp unit to the bottom bridge, wherein between the second clamp unit and the third clamp unit, the second clamp unit and the third clamp unit are constructed to form a swing part in which the brake hose and the harness are curved convexly from the side on which the disc brake is attached toward the side on which the wheel speed sensor is attached. Furthermore, according to certain embodiments of the invention, the third clamp unit includes third harness fixing means which holds the harness and second hose fixing means which holds the brake hose, and the third harness fixing means and the second hose fixing means extend in the vehicle width direction and are disposed substantially horizontally. Therefore, by routing the harness and the brake hose so as to form a part which is curved on one side in the vehicle width direction (that is, so as to form a U-shaped part which is open on the other side), allowance of the harness and the brake hose which can handle expansion/contraction of the front fork is formed in the vehicle width direction. Consequently, it becomes unnecessary to provide a large space on the rear side of the front fork. As a result, increase in the size of the vehicle can be suppressed.

According to certain embodiments of the invention, the brake hose includes a protector member having a cylindrical shape and a hose body which is housed in the protector member, outer diameter of the harness is set to be smaller than that of the protector member, and the second clamp unit and the third clamp unit are constructed so that the harness bundled with the brake hose is routed rearward of the brake hose between the second clamp unit and the third clamp unit. Therefore, by a protector member for the brake hose which is formed relatively strong, the harness can be protected from dusts, water, and the like splashed from the front of the vehicle body.

According to certain embodiments of the invention, the third clamp unit is disposed so as to be biased to the same side as the side on which the second clamp unit is provided in the vehicle width direction. Therefore, since the third clamp unit is disposed so as to be biased in the vehicle width direction, the curved part in the harness and the brake hose can be formed with allowance.

Certain embodiments of invention also include a second stay which fixes the first harness fixing means, the second harness fixing means, and the first hose fixing means integrally with the outer tube; and a third stay which fixes the third harness fixing means and the second hose fixing means integrally to the inner tube. Therefore, in the second clamp unit and the third clamp unit, the harness and the brake hose can be fixed to the front fork by a common stay. Consequently, the number of stays can be decreased.

DESCRIPTION OF EMBODIMENTS

Figure 1:
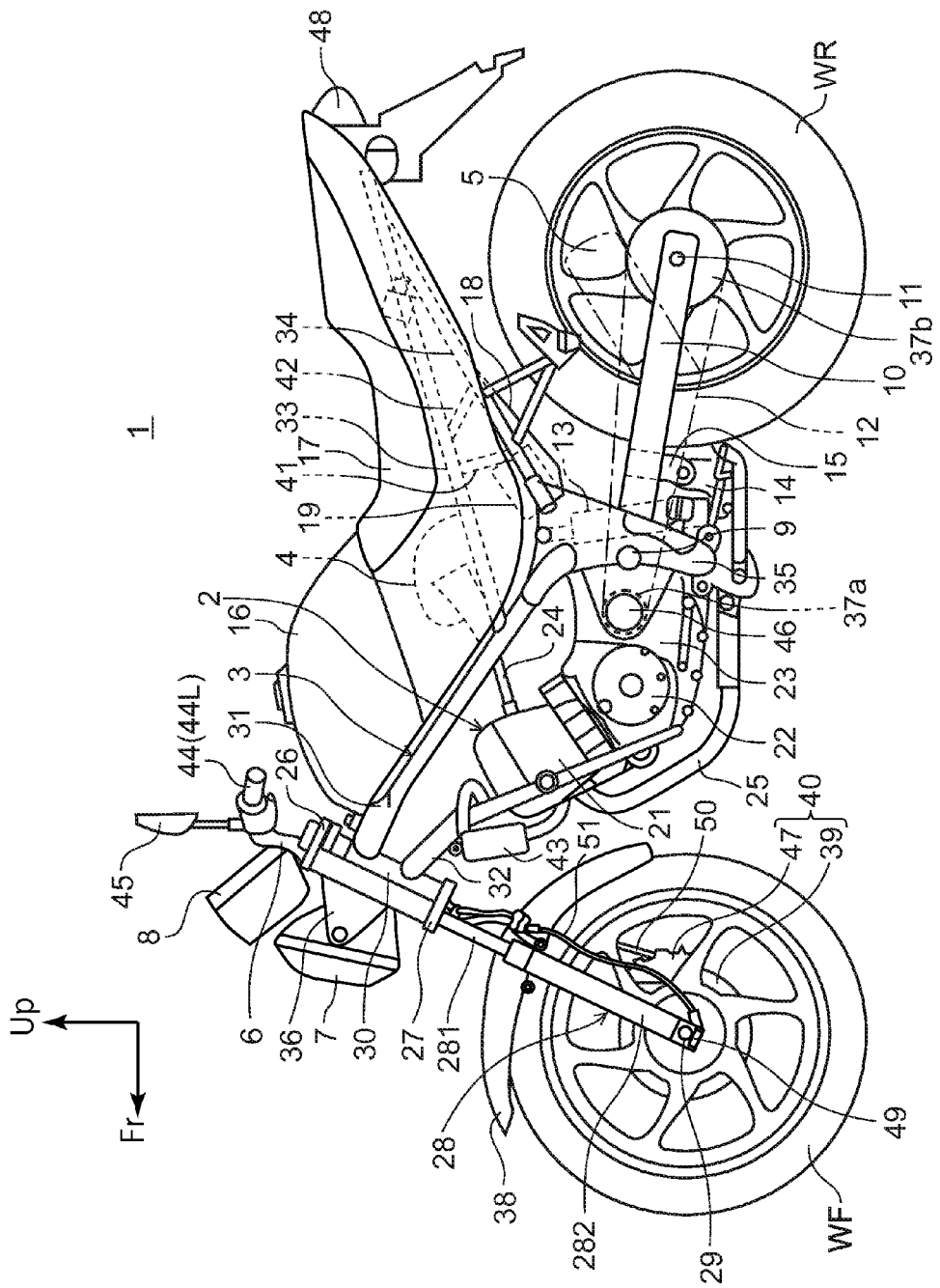
FIG. 1 is a left side view of a motorcycle as a saddled vehicle according to an embodiment of the present invention.
Figure 2:
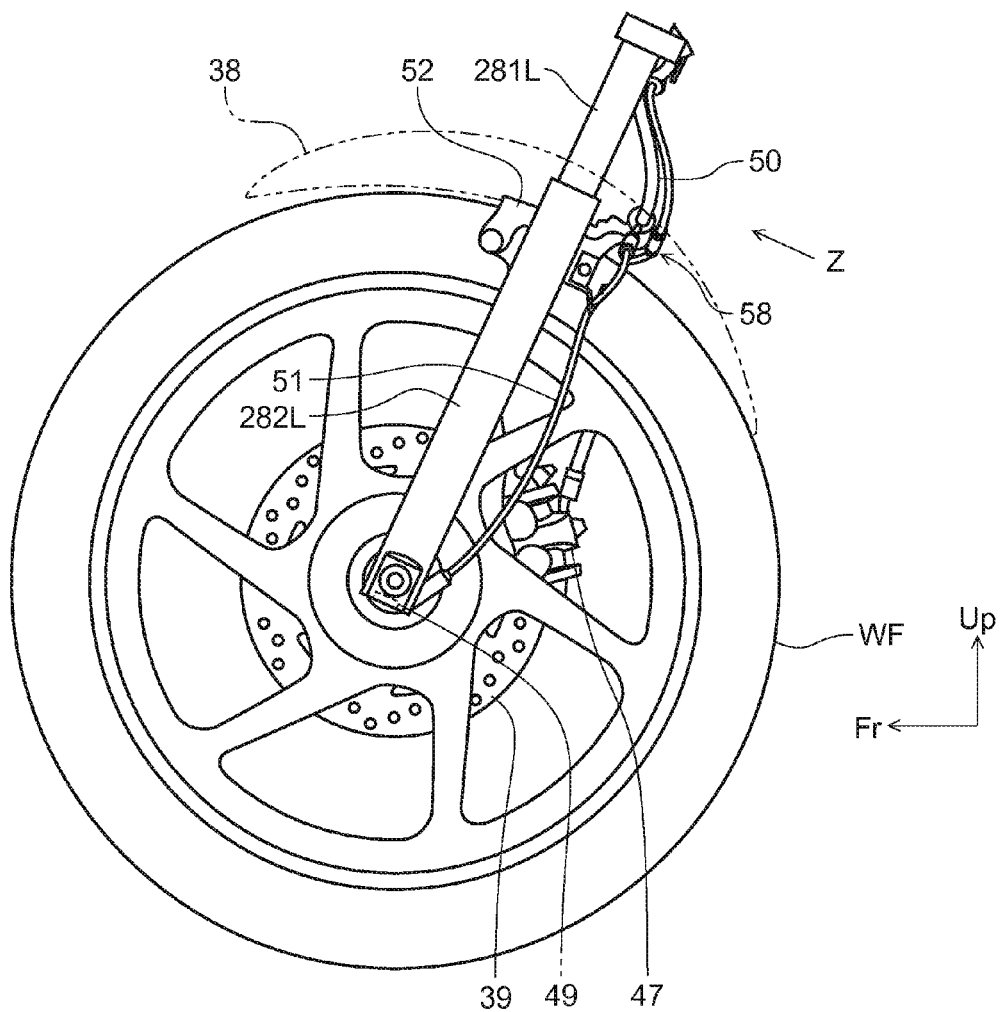
FIG. 2 is an enlarged view of a main part of FIG. 1.
Figure 3:
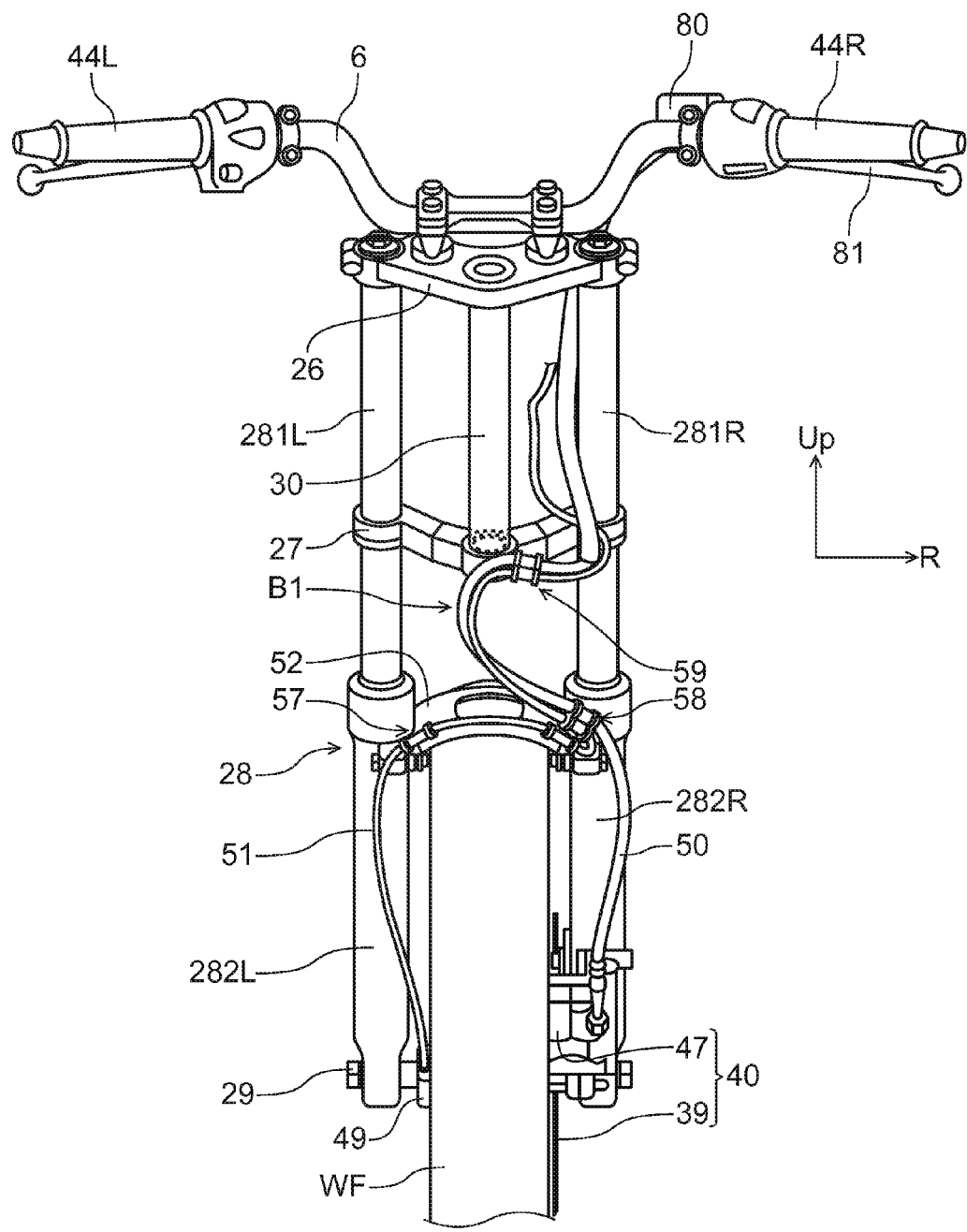
FIG. 3 is a rear view of a front fork and a front wheel WF illustrated in FIG. 2.

Hereinafter, an embodiment of the present invention will be described with reference to the drawings. FIG. 1 is a left side view of a motorcycle as a saddled vehicle according to an embodiment of the present invention. FIG. 2 is an enlarged view of a main part of FIG. 1. FIG. 3 is a rear view of a front fork and a front wheel WF illustrated in FIG. 2. Reference signs written with arrows in FIGS. 1 to 3 and other drawings indicate directions in the motorcycle. Reference signs Fr indicate front, reference signs Rr indicate rear, reference sign R indicates right, and reference sign L indicates left, respectively.

In FIG. 1, a motorcycle 1 is equipped with a single-cylinder four-cycle water-cooled engine 2. A body frame 3 of the motorcycle 1 includes: a main frame 31 whose front end is joined to a part close to the upper end of a head pipe 30 and extending obliquely downward; a down frame 32 whose front end is joined to a part close to the lower end of the head pipe 30 and extending obliquely downward; a seat frame 33 extending obliquely upward and rearward from an intermediate part in the main frame 31; a sub frame 34 joined to the rear part of the seat frame 33 and disposed almost parallel to the seat frame 33 with its front part being slightly lower, and a hanger bracket 35 joined to the rear end of the main frame 31 and the front end of the sub frame 34 and extending downward. Coupling pipes 41 and 42 are provided between the seat frame 33 and the sub frame 34. The above-described respective members constructing the body frame 3 are provided on the right and left sides of the body and paired.

The engine 2 has a cylinder part 21, a crank chamber 22, and a reducer 23. An intake pipe 24 is connected to the rear part of the cylinder part 21, and an end part of the intake pipe 24 is communicated in an air cleaner 4. To the front part of the cylinder part 21, an exhaust pipe 25 is coupled. The exhaust pipe 25 passes below the body and is coupled to a muffler 5 in the rear part of the body. The engine 2 is coupled to the lower part of the hanger bracket 35 and the down frame 32. To the down frame 32, a radiator 43 in which cooling water for the engine 2 is circulated is attached.

In the head pipe 30, a not-illustrated steering stem is disposed so as to be oriented in the vertical directions. A top bridge 26 and a bottom bridge 27 are coupled to the top and bottom of the steering stem, respectively. By the top bridge 26 and the bottom bridge 27, a front fork 28 is supported. A stay 36 extends from the head pipe 30 toward the front of the body. By the stay 36, a head light 7 and a meter device 8 are supported. At the lower end of the front fork 28, a front wheel shaft 29 rotatably supporting the front wheel WF is provided.

A steering handle 6 is attached to the top of the top bridge 26, and grips 44 (a right grip 44R and a left grip 44L) and a mirror 45 are attached to the steering handle 6. A master cylinder 80 for a front-wheel disc brake driven by hydraulic pressure is provided adjacent to the right grip 44R, on the side close to the center of the body. A front brake lever 81 that operates the master cylinder 80 is provided adjacently on the front side of the right grip 44R (see FIG. 3).

The hanger bracket 35 joined to the body frame 3 is provided with a pivot 9 extending in the vehicle width direction. By the pivot 9, the front part of a swing arm 10 is supported so that the swing arm 10 is swingable in the vertical direction. The rear end part of the swing arm 10 is provided with a rear wheel axle 11, and a rear wheel WR as a drive wheel is supported by the rear wheel axle 11. A drive sprocket 37a is coupled to an output shaft 46 of the reducer 23, a driven sprocket 37b is coupled to the rear wheel axle 11, and a driving chain 12 is provided over the sprockets so that an output of the engine 2 is transmitted to the rear wheel WR.

The front end part of the swing arm 10 is supported by the pivot 9, and an intermediate part is supported by a cushion unit 13. The cushion unit 13 is coupled to the swing arm 10 and the body frame 3 (in this case, the hanger bracket 35) between the pivot 9 of the swing arm 10 and the rear wheel WR. The upper end of the cushion unit 13 is supported by the hanger bracket 35 on the front side of a battery 19, and the lower end is coupled to the swing arm 10 via a link mechanism 14 disposed below the swing arm 10. That is, the cushion unit 13 is coupled to a stay 15 that is joined to the swing arm 10 and protrudes downward.

A fuel tank 16 is disposed in the front part on the main frame 31 and the seat frame 33, a passenger seat 17 is disposed in the rear part, and an air cleaner 4 is disposed on the lower front side of the passenger seat 17. A rear fender 18 is supported by the seat frame 33 and the sub frame 34 and extends rearward from a part near the top of the hanger bracket 35. The rear fender 18 is positioned above the rear wheel WR, functions as a mud guard preventing splashing mud and water, and its upper part is formed in a box shape and used as a goods housing case (goods housing part) including at least a housing part of the battery 19. A rear lamp unit 48 is provided in a rear part of the passenger seat 17.

The front fork 28 includes inner tubes 281 connected to each other at the top and bottom by the top bridge 26 and the bottom bridge 27 and outer tubes 282 in which the lower parts of the inner tubes 281 are slidably fit. The inner tubes 281 include a right inner tube 281R positioned in the right front of the head pipe 30 and a left inner tube 281L positioned in the left front of the head pipe 30. The outer tubes 282 include a right outer tube 282R supporting the front wheel WF on the right side and a left outer tube 282L supporting the front wheel WF on the left side. The right outer tube 282R and the left outer tube 282L are coupled to each other by a fender bracket 52 supporting a front fender 38.

On the right side of the front wheel WF, a disc 39 for a front-wheel brake (hereinbelow, simply called "disc") and a brake caliper 47 as components of a front-wheel disc brake 40 are provided. The disc 39 is coupled to the wheel of the front wheel WF, and the brake caliper 47 is fixed to the right outer tube 282R of the front fork 28. A brake hose 50 is extended upward from the brake caliper 47 and coupled to the master cylinder 80 which is attached to the steering handle 6.

At the lower end of the left outer tube 282L of the front fork 28, an electric-type wheel speed sensor 49 that detects the rotational speed of the front wheel WF is provided. A harness 51 including a power supply line, a ground line (GND), and a signal line for supplying power to the wheel speed sensor 49 and obtaining a speed detection signal is extended upward from the wheel speed sensor 49 and is connected to a not-illustrated sensor output receiving part in the meter device 8. The use of the front wheel WF of the wheel speed sensor 49 is, although not limited, to detect the rotation of the front wheel WF. For example, the invention is not limited to calculate speed of the vehicle on the basis of a detection output of the wheel speed sensor 49 and display the speed in a speed meter in the meter device 8 but may be the wheel speed sensor used as a sensor for controlling the engine or a sensor for an Antilock Brake System (ABS).

The harness 51 routed upward along the left outer tube 282L is fixed to a first clamp unit 57 attached to an upper part of the left outer tube 282L and is guided to the right outer tube 282R side by the first clamp unit 57. The harness 51 guided to the right outer tube 282R side is fixed to a second clamp unit 58 attached to an upper part of the right outer tube 282R and the routing direction is changed to the upper inner side. On the other hand, the brake hose 50 routed upward along the right outer tube 282R is fixed to the second clamp unit 58 and is routed toward the upper inner side.

In the second clamp unit 58, at least between the second clamp unit 58 and the bottom bridge 27, the harness 51 is bundled with the brake hose 50 so that the harness 51 whose direction is changed upward is routed along the brake hose 50.

The harness 51 and the brake hose 50 bundled in the second clamp unit 58 are fixed to a third clamp unit 59 which is attached to the bottom bridge 27. The fixing position of the harness 51 and the brake hose 50 to the second clamp unit 58 and the third clamp unit 59 or the orientation direction of the harness 51 and the brake hose 50 by the second clamp unit 58 and the third clamp unit 59 is set so that the harness 51 and the brake hose 50 protrude to the left direction of the body between the second clamp unit 58 and the third clamp unit 59 and can form a swing part B1. The swing part B1 has an effect to assure a sufficient length so that it can be bent between the second clamp unit 58 and the third clamp unit 59 by flexibly changing the curvature between the brake hose 50 and the harness 51 when the brake hose 50 and the harness 51 swing as the front fork 28 expands/contracts.

Above the third clamp unit 59, the brake hose 50 and the harness 51 are routed almost along the right inner tube 281R and are connected to the master cylinder 80 and the meter device 8, respectively.

In the swing part B1, the harness 51 and the brake hose 50 swing in the lateral direction of the body between the second clamp unit 58 and the third clamp unit 59 in accordance with the expansion/contraction operation of the front fork 28.

Figure 4:
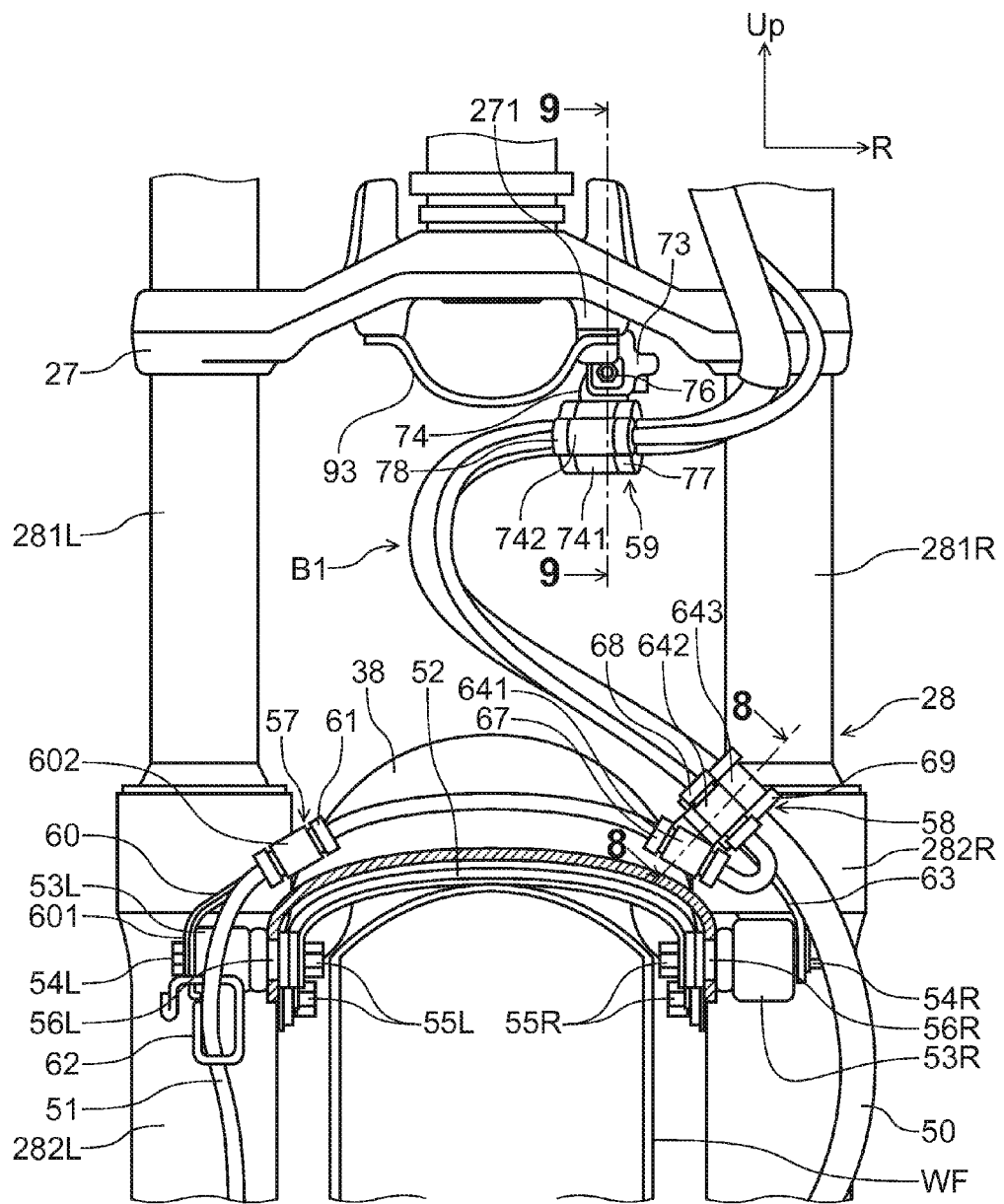
FIG. 4 is a rear view of the main part of the vehicle seen from the Z direction orthogonal to the bottom bridge and the front fork.
Figure 5:
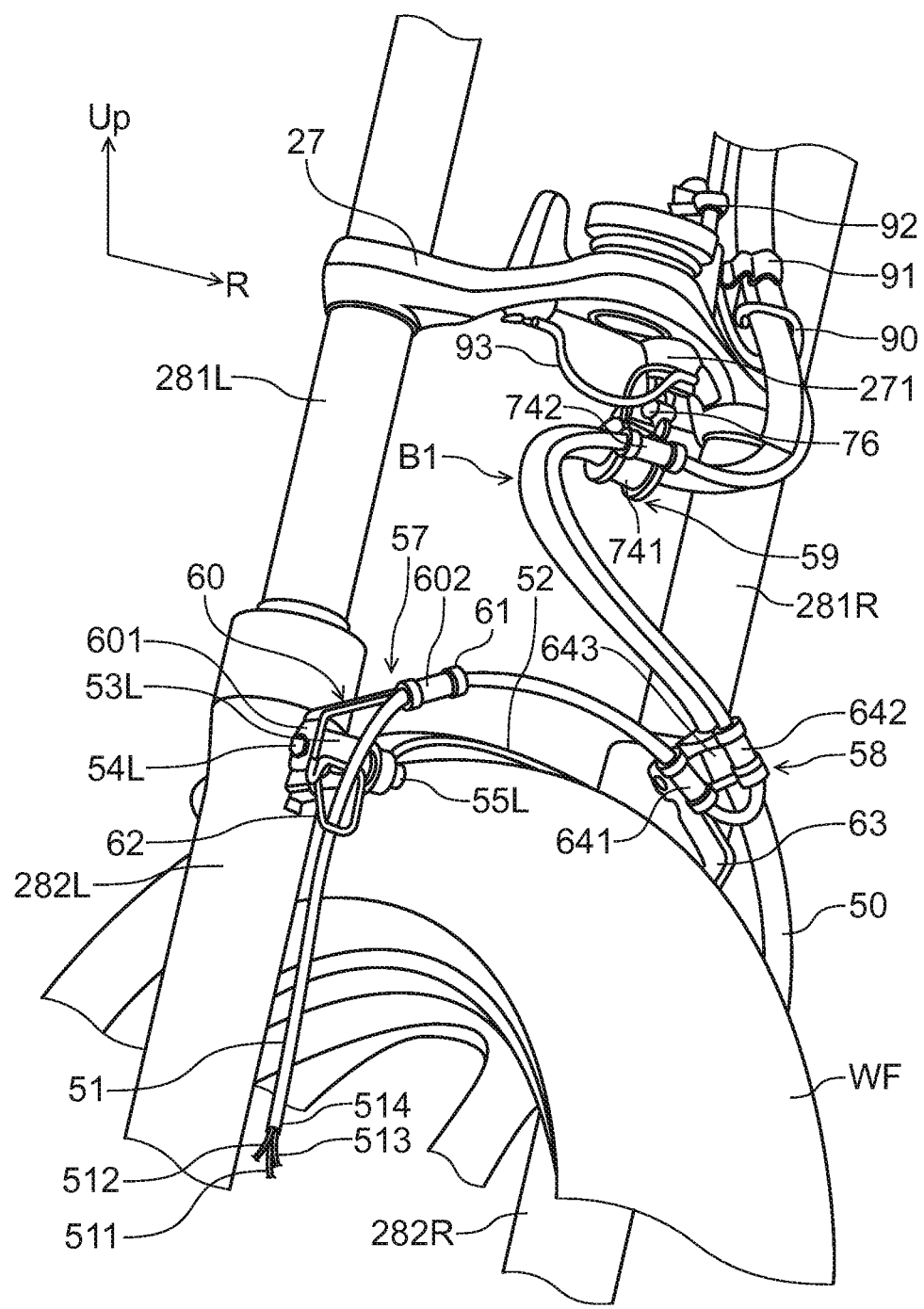
FIG. 5 is a perspective view of the main part of the vehicle when the bottom bridge and the front fork are seen from the left below of the vehicle body.
Figure 6:
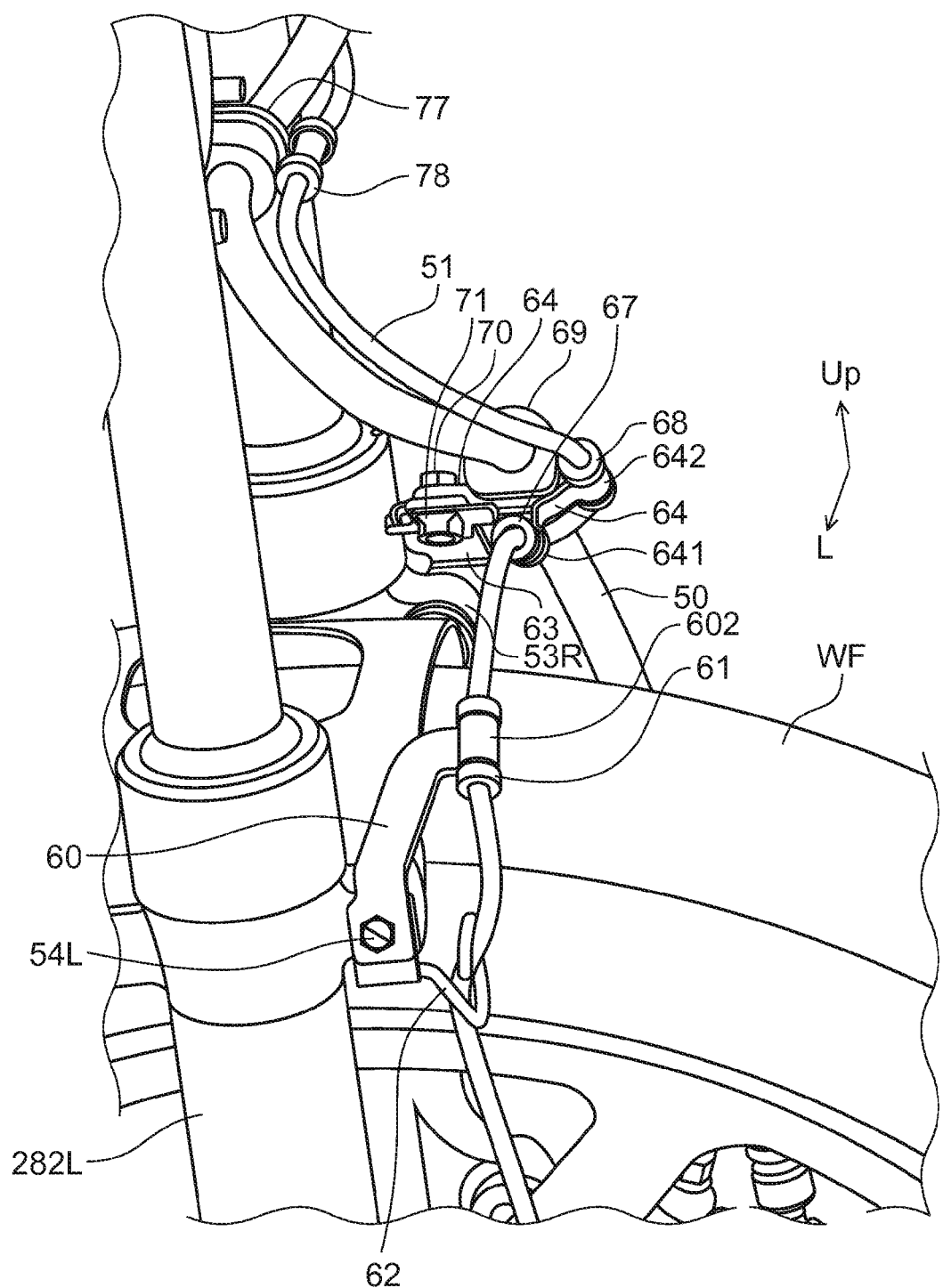
FIG. 6 is a perspective view of the main part of the vehicle when the bottom bridge and the front fork are seen from the upper left of the vehicle body.
Figure 7:
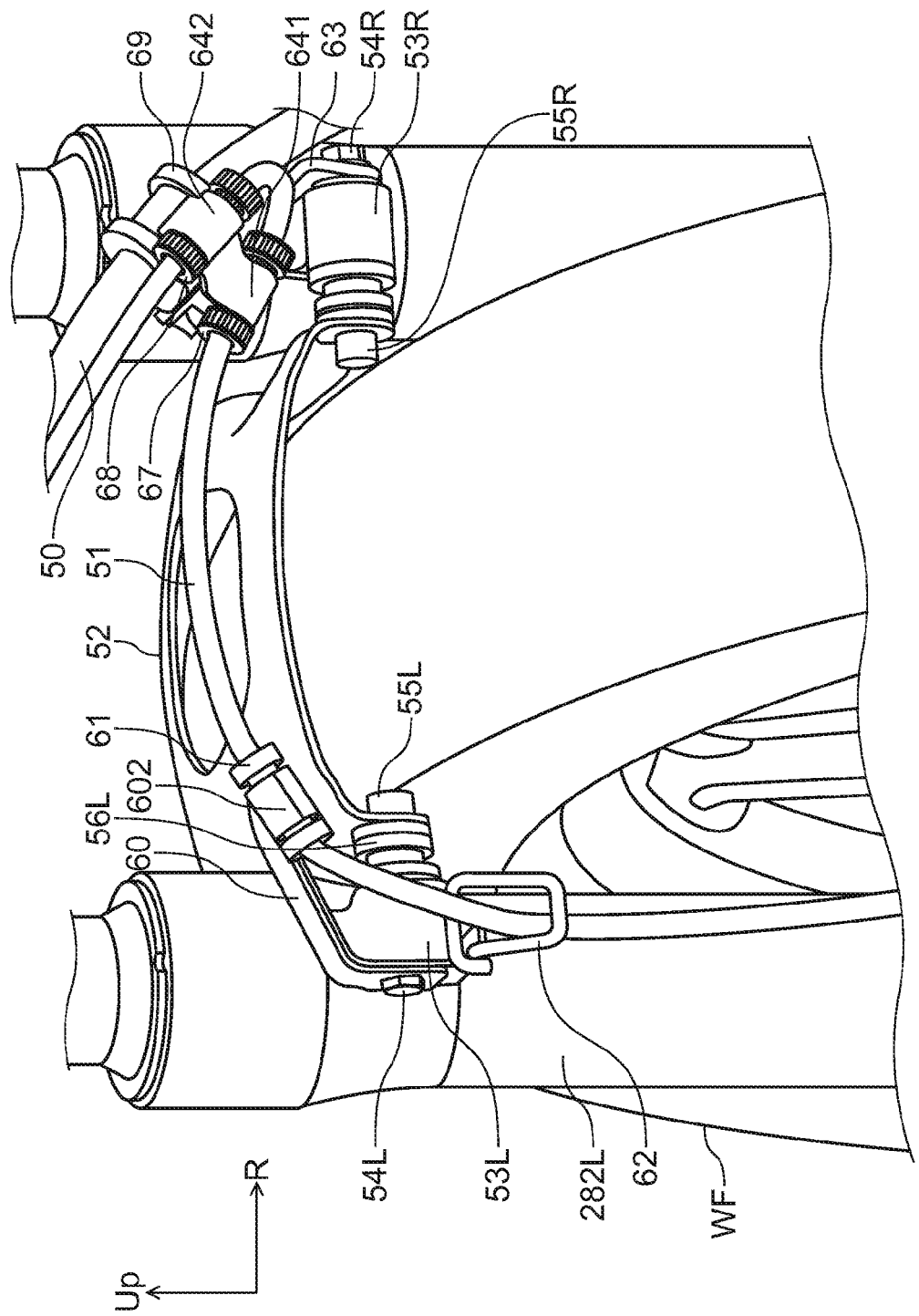
FIG. 7 is a perspective view of the main part of the vehicle when the bottom bridge and the front fork are seen from the upper rear left of the vehicle body.
Figure 8:
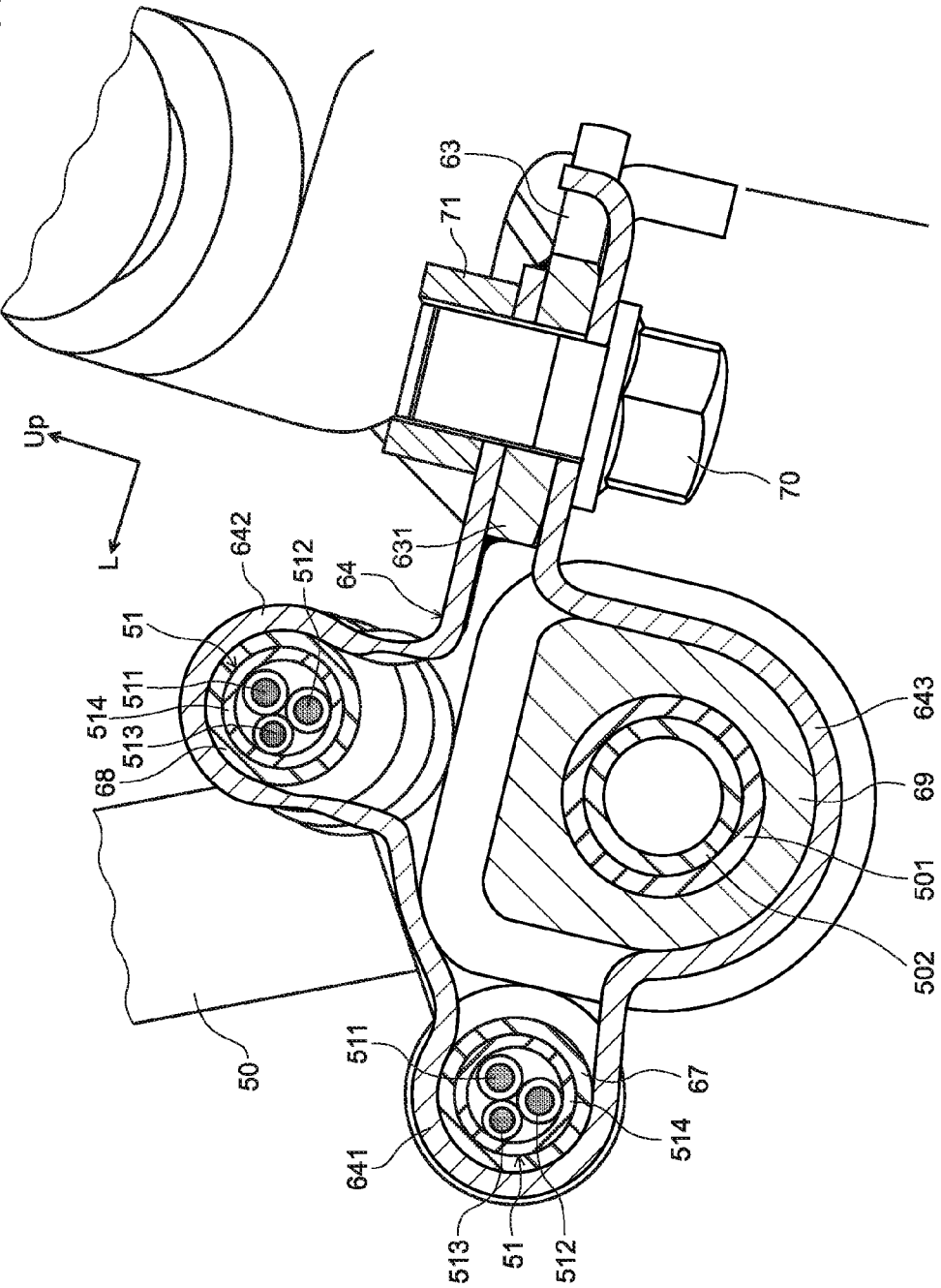
FIG. 8 is a cross section taken along line 8-8 of FIG. 4, showing the second clamp unit.
Figure 9:
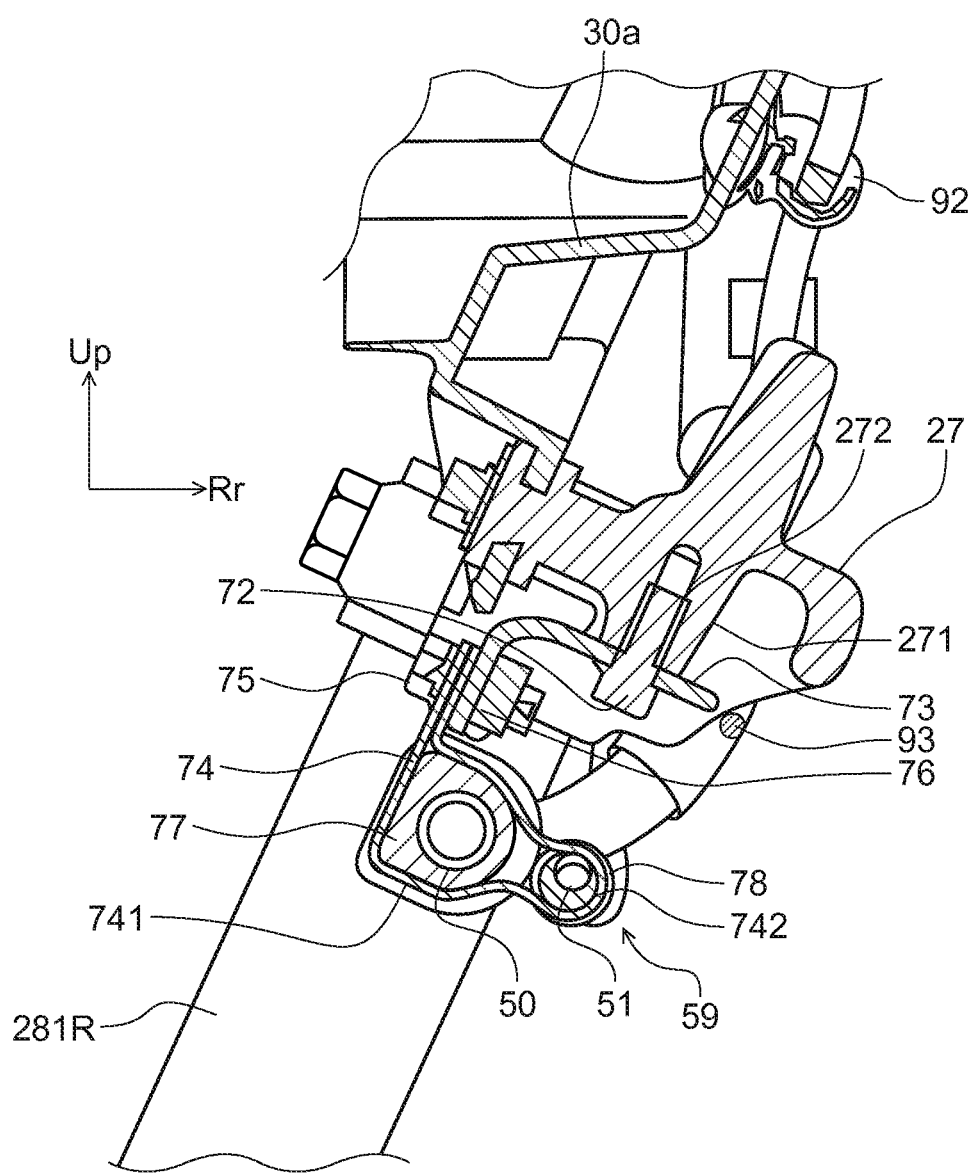
FIG. 9 is a cross section taken along line 9-9 in FIG. 4, showing the third clamp unit.

The routing path of the brake hose 50 and the harness 51 and the configuration of the first, second, and third clamp units 57, 58, and 59 will be described. FIG. 4 is a rear view of the main part of the vehicle seen from the Z direction orthogonal to the bottom bridge 27 and the front fork 28. FIG. 5 is a perspective view of the main part of the vehicle when the bottom bridge 27 and the front fork 28 are seen from the left below of the vehicle body. FIG. 6 is a perspective view of the main part of the vehicle when the bottom bridge 27 and the front fork 28 are seen from the upper left of the vehicle body. FIG. 7 is a perspective view of the main part of the vehicle when the bottom bridge 27 and the front fork 28 are seen from the upper rear left of the vehicle body. FIG. 8 is a cross section taken along line 8-8 of FIG. 4, showing the second clamp unit 58. FIG. 9 is a cross section taken along line 9-9 in FIG. 4, showing the third clamp unit 59.

First, in FIGS. 4 to 8, the fender bracket 52 coupling the right outer tube 282R and the left outer tube 282L is provided. The fender bracket 52 straddles above the front wheel WF and its right and left ends are coupled to a right-side boss 53R and a left-side boss 53L protruding from the right outer tube 282R and the left outer tube 282L in the front/rear directions by fastening members which are bolts 54 and nuts 55.

Rubber bushes 56R and 56L are interposed between the right-side boss 53R and the left-side boss 53L and the right and left ends of the fender bracket 52, and the front fender 38 is attached to the right outer tube 282R and the left outer tube 282L in a rubber mount form together with the fender bracket 52 via the rubber bushes 56R and 56L.

The first clamp unit 57 provided in an upper part of the left outer tube 282L includes a first clamp unit stay (hereinbelow, called "first stay") 60 which is in contact with the outer side in the vehicle width direction of the left-side boss 53L (the left side in FIG. 4) and fixed by a bolt 54L and a nut 55L, and a grommet 61 having a cylindrical shape made of rubber or resin which is supported by the first stay 60. The first stay 60 has an attachment part 601 attached to the left-side boss 53L and a harness first clamp 602 formed in a tubular shape so as to be along the outer periphery of the grommet 61 so as to hold the grommet 61. The harness first clamp 602 is disposed so as to hold the grommet 61 in a position biased to the right side from the center on the upper rear side of the left outer tube 282L. The harness first clamp 602 is disposed right up, that is, left down so that the harness 51 to be held is oriented to the second clamp unit 58 on the right side of the clamp 602 and is oriented downward along the left outer tube 282L on the left side of the harness first clamp 602.

To the lower end of the attachment part 601 of the first stay 60, a harness guide 62 is welded so that the harness 51 held by the grommet 61 is routed so as to gently draw an arc and along the left outer tube 282L without being out to the left side from the left outer tube 282L. The harness guide 62 is made by a metal line (for example, steel line) formed in an annular shape. The shape of the first stay 60 will be further described later with respect to FIG. 10.

The second clamp unit 58 provided in an upper part of the right outer tube 282R includes: a second clamp unit stay (hereinbelow, called "second stay") 63 which is in contact with the outside, that is, the right side of the right-side boss 53R and fixed by the bolt 54R and the nut 55R; a pressing metal fitting 64 welded to the second stay 63; and three grommets 67, 68, and 69 held by the second stay 63 by the pressing metal fitting 64. The grommets 67 and 68 are to hold the harness 51 and are identical or equivalent to the grommet 61 of the first clamp unit 57. On the other hand, the grommet 69 is formed in a size larger than that of the grommets 67 and 68 for the harness 51 so as to be able to hold the brake hose 50.

The second stay 63 includes an attachment part 631 attached to the right-side boss 53R by the bolt 54R and the nut 55R. The pressing metal fitting 64 welded to the second stay 63 forms a harness second clamp 641 as first harness fixing means curved so as to be along almost the half of the outer periphery of the grommets 67 and 68 through which the harness 51 is passed and a harness third clamp 642 (second harness fixing means). Further, the pressing metal fitting 64 is further provided with a hose first clamp 643 as first hose fixing means formed in an annular shape so as to be along the outer periphery of the grommet 69. The pressing metal fittings 64 are coupled to each other by a bolt 70 penetrating the pressing metal fitting 64 and the second stay 63 and a nut 71 screwed onto the bolt 70.

As understood from FIG. 4, the harness second clamp 641, the harness third clamp 642, and the hose first clamp 643 are disposed so as to hold the grommets 67, 68, and 69 in a position biased to the left side from the center of the right outer tube 282R on the upper rear side of the right outer tube 282R. The harness second clamp 641 is disposed right down, that is, left up so that the harness 51 to be held is oriented toward the first clamp unit 57 on the left side of the harness second clamp 641 and changes its orientation direction to the left upper side on the right side of the harness second clamp 641.

The harness third clamp 642 as second harness fixing means is disposed left up, that is, right down so that the harness 51 whose direction is changed by the harness second clamp 641 and oriented toward the left upper side is routed continuously to the left side. The tilt angle (angle from the horizon) of the harness third clamp 642 is larger than that of the harness second clamp 641. That is, above the second clamp unit 58, the harness 51 is routed more upward. The hose first clamp 643 is almost parallel to the harness third clamp 642 and is disposed adjacent to the rear side of the harness third clamp 642. Therefore, above the second clamp unit 58, the harness 51 is routed along the brake hose 50 and on the back of the brake hose 50 (the rear side of the vehicle body).

In FIG. 8, the harness 51 held by the harness second clamp 641 and the harness third clamp 642 includes a positive voltage line 511, an earth wire 512, and a signal line 513 as electric lines used for passing relatively low current to supply power to the wheel speed sensor 49 and to detect relatively small current, which are covered with a vinyl cover 514 and having low rigidity and high flexibility. The brake hose 50 held by the hose first clamp 643 includes a protector tube 501 and a hose body 502 housed in the protector tube 501. The outside diameter of the brake hose 50 (the outside diameter of the protector tube 501) is larger than that of the harness 51 (the outside diameter of the cover 514). With the configuration, the harness 51 routed rearward of the brake hose 50 hides behind the brake hose 50 above the second clamp unit 58 and below the third clamp unit 59.

By routing the harness 51 so as to be hidden behind the brake hose 50, the harness 51 can be made resistive to get dirty by dusts, water, and the like from the front. Since the outside diameter of the harness 51 is smaller than that of the brake hose 50, the range of free deformation is wide. Although it is not easy to predict the deformation range, the brake hose 50 having the minimum curvature radius smaller than that of the harness 51 is also assumed. For example, the minimum curvature radius of the harness 51 is 30 mm, and the minimum curvature radius of the brake hose 50 is 25 mm. Therefore, the invention is not limited to the configuration that the harness 51 is routed so as to hide behind the brake hose 50 in the swing part B1. In the swing part B1, the harness 51 can be set to be longer than the brake hose 50 so that the curvature radius of the harness 51 in the swing part B1 is larger than that of the brake hose 50 in accordance with the minimum curvature radius of each of them. With the configuration, the harness 51 can be routed with room by a relatively large radius in the swing part B1.

Figure 12:
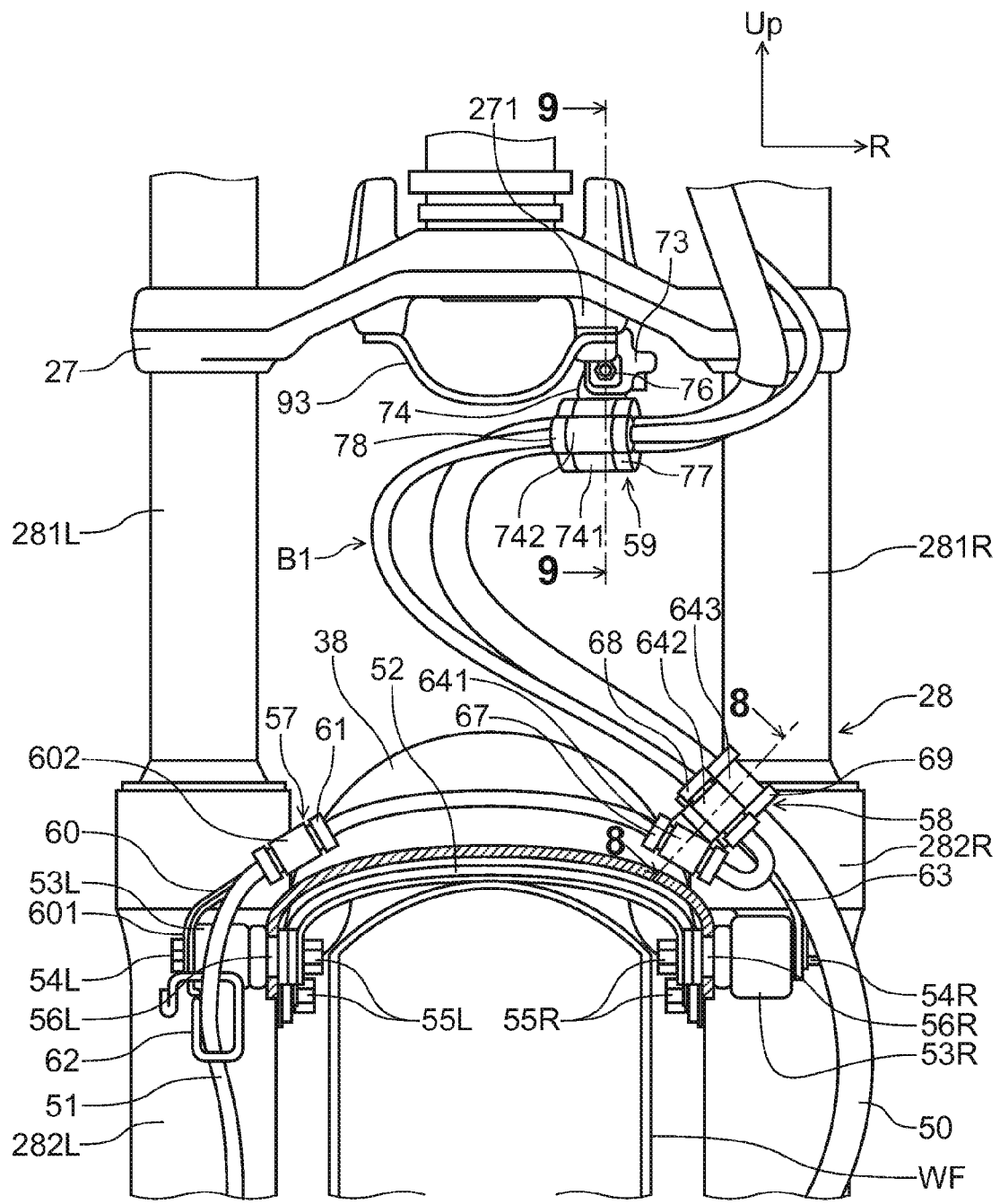
FIG. 12 is a rear view of the main part of the vehicle when the bottom bridge and the front fork are seen from rearward and is a drawing illustrating an example of the swing part B1 in which the harness is set to be longer than the brake hose.

FIG. 12 is a rear view of the main part of the vehicle when the bottom bridge and the front fork are seen from rearward and is a drawing illustrating an example of the swing part B1 in which the harness 51 is set to be longer than the brake hose 50. The same reference numerals as those in FIG. 4 indicate the same or equivalent parts. In the example illustrated in FIG. 12, although the harness 51 does not hide behind the brake hose 50, it can be muted with a larger curvature radius in a permissible range.

Next, in FIGS. 4 to 6 and FIG. 9, a boss 271 for the third clamp unit 59 protrudes downward from the bottom bridge 27. A female screw 272 is formed in the boss 271. The third clamp unit 59 has a stay (hereinbelow, called "third stay") 73 which is attached to the under face of the bottom bridge 27 by a bolt 72 screwed from downward to the female screw 272. Further, the third clamp unit 59 has a holding metal fitting 74 that fixes the harness 51 and the brake hose 50 to the third stay 73, and the holding metal fitting 74 is coupled to the third stay 73 by using a bolt 75 and a nut 76. The holding metal fitting 74 has a hose second clamp 741 as second hose fixing means which comes into contact with the outer periphery of a grommet 77 in order to hold the brake hose 50 via the grommet 77, and a harness fourth clamp 742 as third harness fixing means which is disposed in a direction parallel to the brake hose 50 and perpendicular to the front fork 28 and which comes into contact with the outer periphery of a grommet 78 in order to hold the harness 51 via the grommet 78. That is, the hose second clamp 741 and the harness fourth clamp 742 are disposed on the lower right side of the bottom bridge 27 via the stay 73 by the holding metal fitting 74 as an integral part.

The hose second clamp 741 holds the brake hose 50 so as to be oriented in the vehicle width direction, and the harness fourth clamp 742 holds the harness 51 so as to be oriented in the vehicle width direction behind the brake hose 50. Consequently, the hose second clamp 741 and the harness fourth clamp 742 are oriented in the vehicle width direction and disposed substantially horizontally. Above the third clamp unit 59 to the master cylinder 80, the brake hose 50 can be supported by the vehicle body by also a hose band 90, a wire 91, and the like as guiding parts. Similarly, above the third clamp unit 59, the harness 51 can be supported by a bracket 30a (see FIG. 9) extending forward from the head pipe 30 or the like by using a band 92.

To the vehicle-body rear side end of the third stay 73, the right end of a pressing metal fitting (wire) 93 which holds a not-illustrated main harness electrically connecting the head light 7, the meter device 8, the battery 19, a not-illustrated ECU, and the like is welded.

Figure 10:
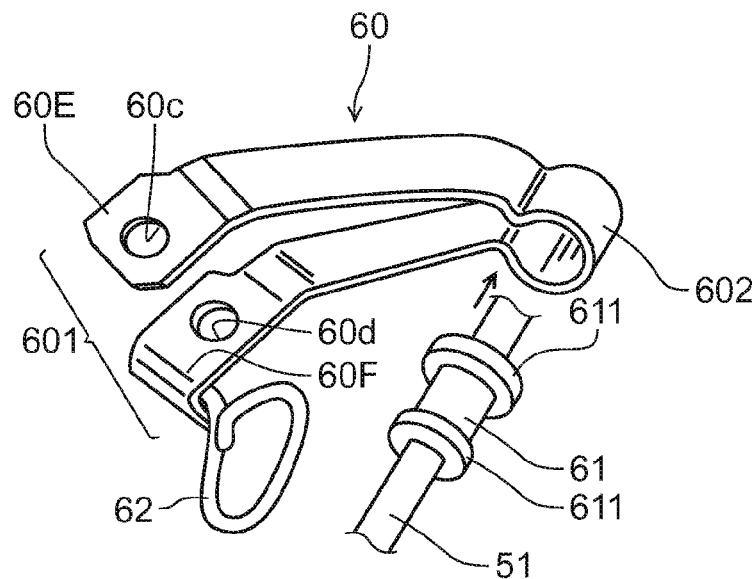
FIG. 10 is a perspective view of the first stay supporting the first clamp unit.

FIG. 10 is a perspective view of the first stay 60. In FIG. 10, the first stay 60 is formed by making a plate member (for example, metal plate) bent. In a state where the first stay 60 is not attached to the left-side boss 53L, both end parts 60E and 60F of the plate member forming the attachment part 601 are apart from each other and open. In a state where the first stay 60 is attached to the left-side boss 53L, the both end parts 60E and 60F are overlapped and the attachment part 601 is closed. In the both end parts 60E and 60F, through holes 60c and 60d through which the bolt 54L can be passed are formed, respectively. In FIG. 10, a perspective view of the grommet 61 held by the harness first clamp 602 is also illustrated together with the first stay 60. The harness 51 is inserted in the grommet 61 and, in this state, the grommet 61 is held by the harness first clamp 602. The grommet 61 is a cylindrical body having flanges 611 on both ends and is made of an elastic member such as rubber or resin. Therefore, when the grommet 61 is pressed to the periphery of the harness 51, the harness 51 is fastened by the resilience force or elastic force of rubber and the flange 611 comes into contact with the end face of the first stay 60, so that the position of the harness 51 with respect to the first stay 60 is fixed.

Figure 11:
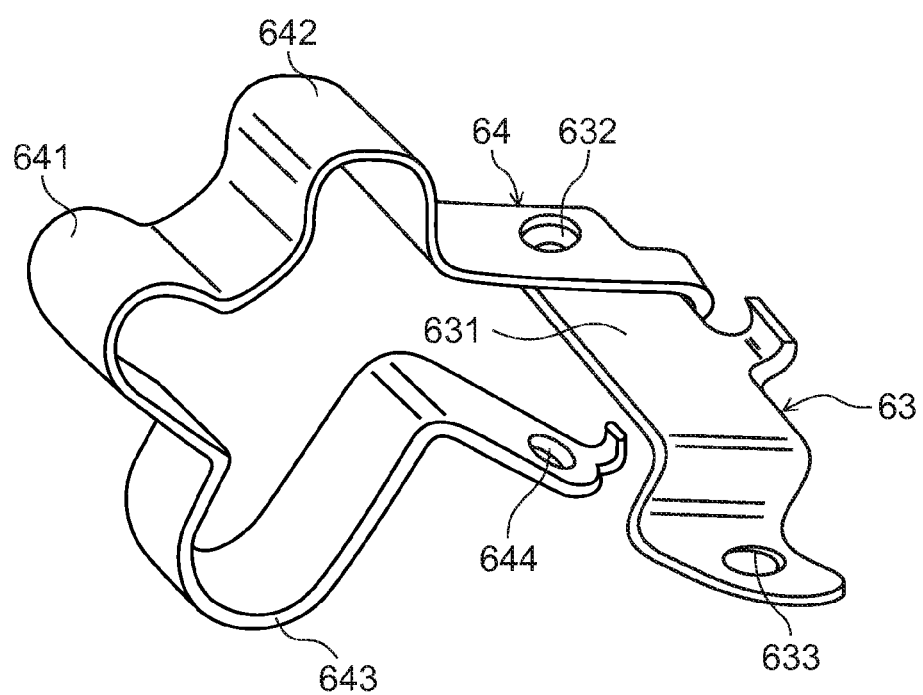
FIG. 11 is a perspective view of the pressing metal fitting as a component of the second clamp unit.

FIG. 11 is a perspective view of the pressing metal fitting 64 as a component of the second clamp unit 58. In FIG. 11, the pressing metal fitting 64 whose one end is welded to the second stay 63 has a harness second clamp 641, a harness third clamp 642, and a hose first clamp 643 curved at curvature adapting to the outer diameter of the harness 51. The pressing metal fitting 64 including the harness second clamp 641, the harness third clamp 642, and the hose first clamp 643 can be formed integrally from a single steel plate. By the pressing metal fitting 64 of the integral type, the grommets 67 and 68 can be held to fix the position of the harness 51 and the grommet 69 for the hose can be collectively supported. In the pressing metal fitting 64 and the second stay 63 welded to each other, a through hole 632 penetrating the pressing metal fitting 64 and the second stay 63 is formed. By using the bolt 70 and the nut 71 penetrating the through hole 632 and a through hole 644 formed at the other end of the pressing metal fitting 64, both ends of the pressing metal fitting 64 are fastened, and the grommets 67, 68, and 69 are supported in a desired position. In the second stay 63, a through hole 633 through which the bolt 55L to be attached to the left-side boss 53L of the left outer tube 282L can be passed is formed.

According to the embodiment, the harness 51 straddled the first clamp unit 57 is guided via the front wheel WF to the second clamp unit 58 on the side opposite to the first clamp unit 57, fixed once in the second clamp unit 58, and can be bundled with the brake hose 50. The second clamp unit 58 and the third clamp unit 59 are constructed so that the harness 51 and the brake hose 50 which are bundled in one form the swing part B1 curved to the inside in the vehicle width direction between the front fender 38 and the bottom bridge 27. The swing part B1 can be displaced mainly in the vehicle width direction between the left inner tube 281L and the right inner tube 281R in correspondence with the extracting/contracting operation of the front fork 28 so that a displacement in the vehicle longitudinal direction can be reduced, and the harness 51 is bundled with the brake hose 50 so that rigidity is increased. Consequently, the displacement amount in the vehicle longitudinal direction in the swing part B1 can be roughly predicted. Therefore, at the time of steering of the front fork 28, even when the interval of adjacent members rearward of the front fork 28 and the front wheel WF, for example, the interval between the radiator 43 and the exhaust pipe 25 is shortened with high precision, interference with the adjacent members can be prevented. As a result, without enlarging the size of the motorcycle 1, efficient layout can be designed.

The present invention can be applied to a saddled vehicle (not only a saddled vehicle two-wheel vehicle but also a saddled vehicle three-wheel vehicle and a saddled vehicle four-wheel vehicle) by modifying the foregoing embodiment without departing from the technical ideas described in the scope of the claims for patent. For example, the shapes of the first, second, and third stays 60, 63, and 73 as components of the first, second, and third clamp units 57, 58, and 59 are arbitrary as long as the harness 51 and the brake hose 50 are held, and the harness 51 and the brake hose 50 are oriented to the above-described directions in the first to third clamp units 57, 58, and 59. Particularly, in the second and third clamp units 58 and 59, the harness 51 and the brake hose 50 are attached to the second stay 63 and the third stay 73 by a common metal fitting. Alternatively, the harness 51 and the brake hose 50 may be attached by using separate metal fittings.

REFERENCE SIGNS LIST

1 . . . motorcycle,
27 . . . bottom bridge,
28 . . . front fork.
29 . . . front wheel shaft,
30 . . . head pipe,
39 . . . disc,
40 . . . front-wheel disc brake,
47 . . . brake caliper,
49 . . . wheel speed sensor,
50 . . . brake hose,
51 . . . harness,
52 . . . fender bracket,
57 . . . first clamp unit,
58 . . . second clamp unit,
59 . . . , third clamp unit
60 . . . first stay,
63 . . . second stay,
73 . . . third stay,
61, 67, 68, 78 . . . grommet for harness,
69, 77 . . . grommet for hose,
281L, 281R . . . inner tube,
282L, 282R . . . outer tube,
641 . . . harness second clamp (first harness fixing means),
642 . . . harness third clamp (second harness fixing means),
643 . . . hose first clamp (first hose fixing means),
741 . . . hose second clamp (second hose fixing means),
742 . . . harness fourth clamp (third harness fixing means)

The invention claimed is:
1. A saddled vehicle comprising:
a front fork including a pair of right and left inner tubes and outer tubes in which lower parts of the inner tubes are slidably fit and supporting a front wheel by lower ends of the outer tubes:
a disc brake and a wheel speed sensor detecting rotation of the front wheel,
wherein the disc brake is a single disc brake for the front wheel, which is provided on only one of right and left sides of the front wheel, and
wherein the wheel speed sensor is provided on the other side of the right and left sides of the front wheel, a brake hose and a harness are routed upward from the disc brake and the wheel speed sensor, respectively;
a first clamp unit that fixes the harness at an upper portion of the outer tube on the side provided with the wheel speed sensor; and
a second clamp unit that bundles and fixes the harness routed via the first clamp unit and the brake hose at substantially the same height as the first clamp unit on an upper portion of the outer tube on the side on which the disc brake is provided, and routes the harness and the brake hose further upward from the fixing position,
wherein the second clamp unit comprises:
first harness fixing means that fixes the harness oriented from the first clamp unit toward the second clamp unit; and second harness fixing means that changes an orientation direction of the harness fixed by the first harness fixing means so as to be oriented along the brake hose which is pulled from the disc brake and routed upward and fixes the harness.

2. The saddled vehicle according to claim 1, wherein the second clamp unit further comprises first hose fixing means that fixes the brake hose at a height which is substantially the same as that of the second harness fixing means.

3. The saddled vehicle according to claim 1, further comprising: a bottom bridge coupling the pair of right and left inner tubes to each other at the bottom of a head pipe provided in a vehicle body front part; and a third clamp unit that fixes the harness and the brake hose routed upward from the second clamp unit to the bottom bridge, wherein between the second clamp unit and the third clamp unit, the second clamp unit and the third clamp unit are constructed to form a swing part in which the brake hose and the harness are curved convexly from the side on which the disc brake is attached toward. the side on which the wheel speed sensor is attached.

4. A saddled vehicle comprising:

a front fork including a pair of right and left inner tubes and outer tubes in which lower parts of the inner tubes are slidably fit and supporting a front wheel by lower ends of the outer tubes;

a disc brake and a wheel speed sensor detecting rotation of the front wheel, wherein the disc brake is a single disc brake for the front wheel, which is provided on only one of right and left sides of the front wheel, and wherein the wheel speed sensor is provided on the other side of the right and left sides of the front wheel, a brake hose and a harness are routed upward from the disc brake and the wheel speed sensor, respectively;

a first clamp unit that fixes the harness at an upper portion of the outer tube on the side provided with the wheel speed sensor;

a second clamp unit that bundles and fixes the harness routed via the first clamp unit and the brake hose at substantially the same height as the first clamp unit on an upper portion of the outer tube on the side on which the disc brake is provided, and routes the harness and the brake hose further upward from the fixing position;

a bottom bridge coupling the pair of right and left inner tubes to each other at the bottom of a head pipe provided in a vehicle body front part; and a third clamp unit that fixes the harness and the brake hose routed upward from the second clamp unit to the bottom bridge, wherein between the second clamp unit and the third clamp unit, the second clamp unit and the third clamp unit are constructed to form a swing part in which the brake hose and the harness are curved convexly from the side on which the disc brake is attached toward the side on which the wheel speed sensor is attached.

5. The saddled vehicle according to claim 4, wherein the brake hose includes a protector member having a cylindrical shape and a hose body which is housed in the protector member, outer diameter of the harness is set to be smaller than that of the protector member, and the second clamp unit and the third clamp unit are constructed so that the harness bundled with the brake hose is routed rearward of the brake hose between the second clamp unit and the third clamp unit.

6. The saddled vehicle according to claim 4, wherein the third clamp unit is disposed so as to be biased to the same side as the side on which the second clamp unit is provided in the vehicle width direction.

7. The saddled vehicle according to claim 6, wherein the third clamp unit includes third harness fixing means which holds the harness and second hose fixing means which holds the brake hose, and the third harness fixing means and the second hose fixing means extend in the vehicle width direction and are disposed substantially horizontally.

8. The saddled vehicle according to claim 7, further comprising:

a second stay which fixes the first harness fixing means, the second harness fixing means, and the first hose fixing means integrally with the outer tube; and a third stay which fixes the third harness fixing means and the second hose fixing means integrally to the inner tube.

9. The saddled vehicle according to claim 5, wherein the third clamp unit is disposed so as to be biased to the same side as the side on which the second clamp unit is provided in the vehicle width direction.

* * * * *